（12） United States Patent
Kikkawa et al.

(10) Patent No.: US 12,507,790 B2
(45) Date of Patent: Dec. 30, 2025

(54) INTERDENTAL CLEANING TOOL

(71) Applicant: KOBAYASHI PHARMACEUTICAL CO., LTD., Osaka (JP)

(72) Inventors: Tasuku Kikkawa, Ibaraki (JP); Yuji Saiki, Ibaraki (JP); Tomokazu Yoshida, Ibaraki (JP)

(73) Assignee: KOBAYASHI PHARMACEUTICAL CO., LTD., Osaka (JP)

( * ) Notice: Subject to any disclaimer, the term of this patent is extended or adjusted under 35 U.S.C. 154(b) by 891 days.

(21) Appl. No.: 17/256,247

(22) PCT Filed: May 16, 2019

(86) PCT No.: PCT/JP2019/019548
§ 371 (c)(1),
(2) Date: May 13, 2021

(87) PCT Pub. No.: WO2020/003797
PCT Pub. Date: Jan. 2, 2020

(65) Prior Publication Data
US 2022/0117385 A1    Apr. 21, 2022

(30) Foreign Application Priority Data
Jun. 29, 2018   (JP) ................................ 2018-125595

(51) Int. Cl.
*A61C 15/00*   (2006.01)
*A46B 1/00*   (2006.01)
(Continued)

(52) U.S. Cl.
CPC .............. *A46B 5/0029* (2013.01); *A46B 1/00* (2013.01); *A61C 15/00* (2013.01); *A46B 9/04* (2013.01); *A46B 2200/108* (2013.01)

(58) Field of Classification Search
CPC ..... A61C 15/02; A46B 9/025; A46B 15/0081; A46B 9/04
See application file for complete search history.

(56) References Cited

U.S. PATENT DOCUMENTS 6,082,999 A * 7/2000 Tcherny ............. A46B 11/0006
433/80
2009/0230756 A1* 9/2009 Crossman .......... A46B 15/0091
132/329
(Continued)

FOREIGN PATENT DOCUMENTS

JP   2018-57841 A   4/2018
JP   2018-68514 A   5/2018
(Continued)

OTHER PUBLICATIONS

International Search Report, issued in PCT/JP2019/019548, PCT/ISA/210, dated Jul. 9, 2019.
(Continued)

*Primary Examiner* — Michael D Jennings
(74) *Attorney, Agent, or Firm* — Birch, Stewart, Kolasch & Birch, LLP (57) ABSTRACT

Provided is an interdental cleaning tool that can be smoothly inserted between back teeth. An interdental cleaning tool according to the present invention includes: a cleaning tool body that is made of a synthetic resin, and includes a grip portion that is capable of being gripped with fingers of a user and a shaft portion that extends in one direction from the grip portion; and a cleaning portion configured to clean between teeth, covering a leading end of the shaft portion, and made of an elastomer, wherein (angle b)/(angle a) is 0.82 or more, where the angle a is a rotational angle (degrees) when a torque value A is measured, the torque value A being a maximum torque value (N·cm) when the grip portion is rotated at a rotational speed of 10 rpm about a position (Continued)

located 6 mm away from a leading end of the cleaning portion, and the angle b is a rotational angle (degrees) when a torque value B is measured, the torque value B being a maximum torque value (N·cm) when the grip portion is rotated at a rotational speed of 10 rpm about a position located 10 mm away from the leading end of the cleaning portion.

6 Claims, 5 Drawing Sheets

(51) Int. Cl.
*A46B 5/00* (2006.01)
*A46B 9/04* (2006.01)

(56) References Cited

U.S. PATENT DOCUMENTS

| | | | | |
|---|---|---|---|---|
| 2010/0024839 | A1* | 2/2010 | Kalbfeld | A61C 15/02 132/329 |
| 2015/0114428 | A1* | 4/2015 | Kato | B29C 45/0441 264/243 |
| 2017/0290412 | A1* | 10/2017 | Pires | A46B 9/028 |
| 2017/0319309 | A1 | 11/2017 | Gengyo et al. | |
| 2018/0193119 | A1* | 7/2018 | Butz | A46B 1/00 |
| 2019/0110872 | A1* | 4/2019 | Kido | A61C 15/00 |
| 2019/0192265 | A1 | 6/2019 | Kikkawa et al. | |

FOREIGN PATENT DOCUMENTS

| | | | | |
|---|---|---|---|---|
| WO | WO-2010014623 A1 * | 2/2010 | | A46B 1/00 |
| WO | WO 2013/176297 A1 | 11/2013 | | |
| WO | WO 2016/076241 A1 | 5/2016 | | |
| WO | WO-2016113928 A1 * | 7/2016 | | A46B 5/00 |
| WO | WO-2017104784 A1 * | 6/2017 | | A61C 15/02 |

OTHER PUBLICATIONS

Written Opinion of the International Searching Authority, issued in PCT/JP2019/019548, PCT/ISA/237, dated Jul. 9, 2019.
English translation of the Japanese Office Action for corresponding Japanese Application No. 2018-125595, dated Jul. 4, 2023.
Japanese Office Action for Japanese Application No. 2018-125595, dated May 10, 2022, with English translation.
Japanese Office Action for Japanese Application No. 2018-125595, dated Nov. 8, 2022, with an English translation.
Extended European Search Report for European Application No. 19826253.7, dated May 23, 2022.
European Communication pursuant to Article 94(3) EPC for European Application No. 19 826 253.7, dated Oct. 13, 2025.

* cited by examiner

|  |  | Ex.1 | Ex.2 | Ex.3 | Ex.4 | Ex.5 | Ex.6 | Ex.7 | Ex.8 | Ex.9 | Ex.10 | Com.Ex. |
|---|---|---|---|---|---|---|---|---|---|---|---|---|
|  | Size | SSSS-SS | SSS-S | SSS-S | SSS-S | SS-M | M-L | SSSS-SS | SSS-S | SS-M | M-L | SS-M |
|  | Thickness at position A (mm) | 0.55 | 0.74 | 0.74 | 0.74 | 0.77 | 0.82 | 0.55 | 0.74 | 0.77 | 0.82 | 0.77 |
|  | Thickness at position C (mm) | 1.07 | 1.10 | 1.10 | 1.10 | 1.14 | 1.24 | 1.07 | 1.10 | 1.14 | 1.24 | 1.14 |
| Maximum torque angle (°) | Position A (angle a) | 51.7 | 55.5 | 57.9 | 47.8 | 41.5 | 40.8 | 49.0 | 49.5 | 33.7 | 29.2 | 36.0 |
|  | Position B (angle b) | 45.9 | 46.8 | 50.9 | 48.0 | 40.6 | 41.8 | 43.0 | 50.3 | 29.7 | 28.8 | 29.2 |
| Maximum torque strength (N·cm) | Position A (torque value A) | 0.36 | 0.59 | 0.58 | 0.63 | 0.73 | 0.62 | 0.32 | 0.44 | 0.65 | 0.52 | 0.41 |
|  | Position B (torque value B) | 0.91 | 0.92 | 1.00 | 1.13 | 1.20 | 1.09 | 0.87 | 0.91 | 1.21 | 1.08 | 0.73 |
|  | Position C (torque value C) | 1.76 | 1.62 | 1.80 | 1.88 | 2.06 | 2.19 | 1.88 | 1.45 | 1.87 | 1.85 | 1.19 |
|  | Evaluation | 2 | 3 | 3 | 2 | 1 | 1 | 3 | 1 | 2 | 2 | 4 |
|  | (Angle b)/(angle a) | 0.888 | 0.843 | 0.879 | 1.004 | 0.978 | 1.025 | 0.878 | 1.017 | 0.881 | 0.985 | 0.811 |
|  | (Torque value C) − (torque value A) | 1.40 | 1.03 | 1.22 | 1.25 | 1.33 | 1.57 | 1.56 | 1.01 | 1.22 | 1.33 | 0.78 |

INTERDENTAL CLEANING TOOL

TECHNICAL FIELD

The present invention relates to an interdental cleaning tool.

BACKGROUND ART

Conventionally, various types of interdental cleaning tools have been proposed, and an interdental cleaning tool as follows is disclosed in Patent Literature 1 as one such interdental cleaning tool. That is to say, this interdental cleaning tool includes a cleaning tool body in which a grip portion that is capable of being gripped with fingers and a shaft portion that extends in one direction from the grip portion are made of a resin material as one piece, wherein a leading end of the shaft portion is covered with a resin cleaning portion having a brush.

CITATION LIST

Patent Literature

Patent Literature 1: WO 2013/176297

SUMMARY OF INVENTION

Technical Problem

Incidentally, the cleaning portion of this sort of interdental cleaning tool is inserted between teeth in a state in which the grip portion is gripped with fingers, and the shaft portion is bent at various angles depending on the position of teeth between which the cleaning portion is inserted. For example, when the cleaning portion is inserted between back teeth, the shaft portion is significantly bent, and the cleaning of the areas in between the teeth is performed in this state.

However, further improvements are necessary in order to smoothly insert an interdental cleaning tool between back teeth, and there is a demand for an interdental cleaning tool with good usability also when being inserted between back teeth. The present invention has been made in order to solve the above-described problem, and it is an object thereof to provide an interdental cleaning tool that can be smoothly inserted between back teeth.

Solution to Problem

The present invention is directed to an interdental cleaning tool including: a cleaning tool body that is made of a synthetic resin, and includes a grip portion that is capable of being gripped with fingers of a user and a shaft portion that extends in one direction from the grip portion; and a cleaning portion configured to clean between teeth, covering a leading end of the shaft portion, and made of an elastomer, wherein (rotational angle b)/(rotational angle a) is 0.82 or more, where the rotational angle a is a rotational angle (degrees) when a torque value A is measured, the torque value A being a maximum torque value (N·cm) when the grip portion is rotated at a rotational speed of 10 rpm about a position located 6 mm away from a leading end of the cleaning portion, and the rotational angle b is a rotational angle (degrees) when a torque value B is measured, the torque value B being a maximum torque value (N·cm) when the grip portion is rotated at a rotational speed of 10 rpm about a position located 10 mm away from the leading end of the cleaning portion.

The above-described interdental cleaning tool may be such that (torque value C)−(torque value A)≥0.8 is satisfied, where the torque value C is a maximum torque value (N·cm) when the grip portion is rotated at a rotational speed of 10 rpm about a position located 15 mm away from the leading end of the cleaning portion.

The above-described interdental cleaning tool may be such that an outer diameter of the cleaning portion located 6 mm away from the leading end thereof is 0.4 to 1.5 mm, and an outer diameter of the cleaning portion located 15 mm away from the leading end thereof is 0.5 to 2.0 mm.

The above-described interdental cleaning tool may be such that the cleaning tool body contains a glass fiber.

Advantageous Effects of Invention

The interdental cleaning tool according to the present invention is not too soft and is unlikely to break during use.

DESCRIPTION OF EMBODIMENTS

Figure 1:
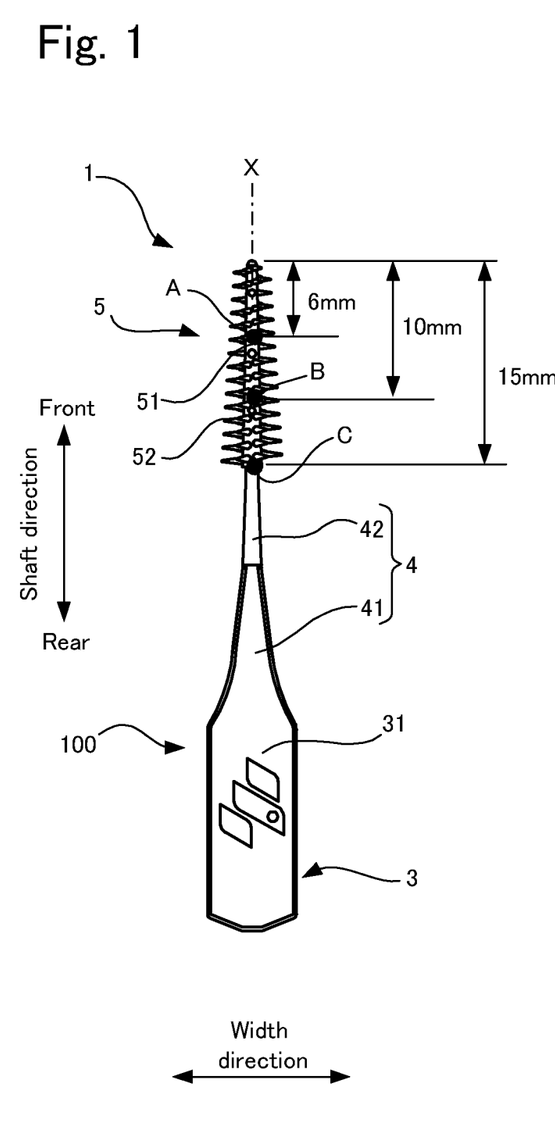
FIG. 1 is a plan view of an interdental cleaning tool according to an embodiment of the present invention.
Figure 2:
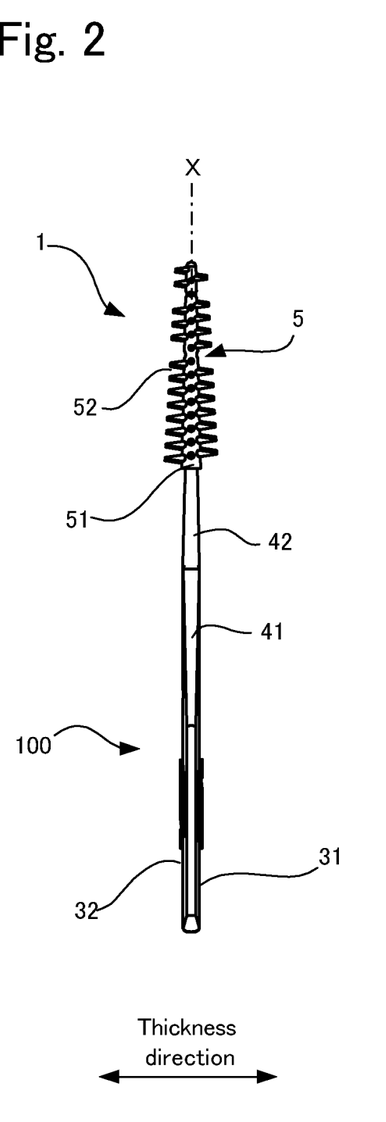
FIG. 2 is a side view of FIG. 2.

Hereinafter, an embodiment of an interdental cleaning tool according to the present invention will be described with reference to the drawings. FIG. 1 is a plan view of the interdental cleaning tool, and FIG. 2 is a side view of FIG. 1. For the sake of ease of description, the description below will be given based on the directions in the drawings. In the directions, the left-right direction in FIG. 1 may be alternatively referred to as a width direction or a left-right direction, and the upper side in FIG. 1 may be alternatively referred to as a leading end side or a front side. Note that the present invention is not limited to the definition of these directions.

1. Interdental Cleaning Tool

As shown in FIGS. 1 and 2, an interdental cleaning tool 1 includes a cleaning tool body 100 having a plate-like grip portion 3 that is capable of being gripped with fingers and a shaft portion 4 that extends from an end of the grip portion 3. A cleaning portion 5 formed in the shape of a brush is attached to the leading end of the shaft portion 4. In the description below, the direction in which the shaft portion 4 extends is taken as a shaft direction (one direction) or a front-rear direction, the side on which the cleaning portion 5 is provided is taken as a front end or a leading end, and the side that opposite thereto is taken as a rear end. Furthermore, the direction that is orthogonal to the shaft direction in the planar direction of the plate-like grip portion 3 is taken as a width direction or a left-right direction, and the direction in which the two faces of the plate-like grip portion 3 are linked to each other is taken as a thickness direction.

The grip portion 3 is formed in the shape of a rectangular plate in a plan view, and has a first face 31 and a second face 32 that face each other in the thickness direction.

Next, the shaft portion 4 will be described. The shaft portion 4 includes a first region 41 that continues from the leading end of the grip portion 3 and a second region 42 that continues from the leading end of the first region 41, and these two regions 41 and 42 are formed as one piece. The first region 41 is formed in the shape of a triangle with a width in the left-right direction that decreases toward the front side from the leading end of the grip portion 3 in a plan view. The second region 42 is formed in the shape of a rod that extends in the front-rear direction from the leading end of the first region 41, the rod having a width that slightly decreases toward the leading end. There is no particular limitation on the length of the shaft portion 4, but it may be 10 to 60 mm, for example.

The grip portion 3 and the shaft portion 4 are made of a resin material as one piece. Examples of the resin material that can be used include polypropylene, ABS, polybutylene terephthalate, polycarbonate, polyethylene terephthalate, polystyrene, and polyacetal. Furthermore, these materials may contain a glass fiber. The proportion of the glass fiber mixed in is preferably 15 to 40%, more preferably 20 to 35%, and particularly preferably 25 to 30%, for example.

Next, the cleaning portion 5 will be described. The cleaning portion 5 includes a cover portion 51 in the shape of a thin film that covers the outer circumferential face of the second region 42 of the shaft portion 4 over the area from the vicinity of the middle in the shaft direction thereof to the leading end, and a large number of bristles 52 that function as a brush projecting from the outer circumferential face of the cover portion 51 in directions that are orthogonal to the shaft direction, wherein these constituent elements are formed as one piece. The bristles 52 are arranged on the outer circumferential face of the cover portion 51 at predetermined intervals in the front-rear direction, and a plurality of such lines in the front-rear direction are formed throughout the circumferential direction of the cover portion 51. Furthermore, the bristles 52 are each formed thinner toward the tip. If the cleaning portion 5 covers the shaft portion 4 in this manner, the thickness of the cleaning portion 5 is greater than that of the cleaning tool body 100 including the grip portion 3.

There is no particular limitation on the outer diameter of the cleaning portion 5, but, for example, it is preferable that the outer diameter of the cleaning portion 5 (not including the bristles 52) at a position A located 6 mm away from the leading end of the cleaning portion is 0.4 to 1.5 mm, for example, and it is also preferable that the outer diameter of the cleaning portion 5 at a position C located 15 mm away from the leading end is 0.5 to 2.0 mm, for example.

The cleaning portion 5 may be made of an elastomer, for example. Examples of the elastomer include a styrene-based elastomer, silicone, an olefin-based elastomer, and a polyester-based elastomer.

2. Bending Properties

Next, the bending properties of the interdental cleaning tool 100 will be described. The interdental cleaning tool 100 is bent at various angles depending on the position of teeth between which the interdental cleaning tool is inserted, and removes impurities such as plaque by being moved back and forth in that bent state. In particular, when the cleaning portion 5 is inserted between back teeth, the cleaning portion 5 is inserted in a state of being significantly bent relative to the grip portion 3. During the procedure in which the cleaning portion 5 is inserted, as shown in FIG. 3, the bent portion shifts from the leading end of the cleaning portion 5 toward the rear end.

Figure 3:
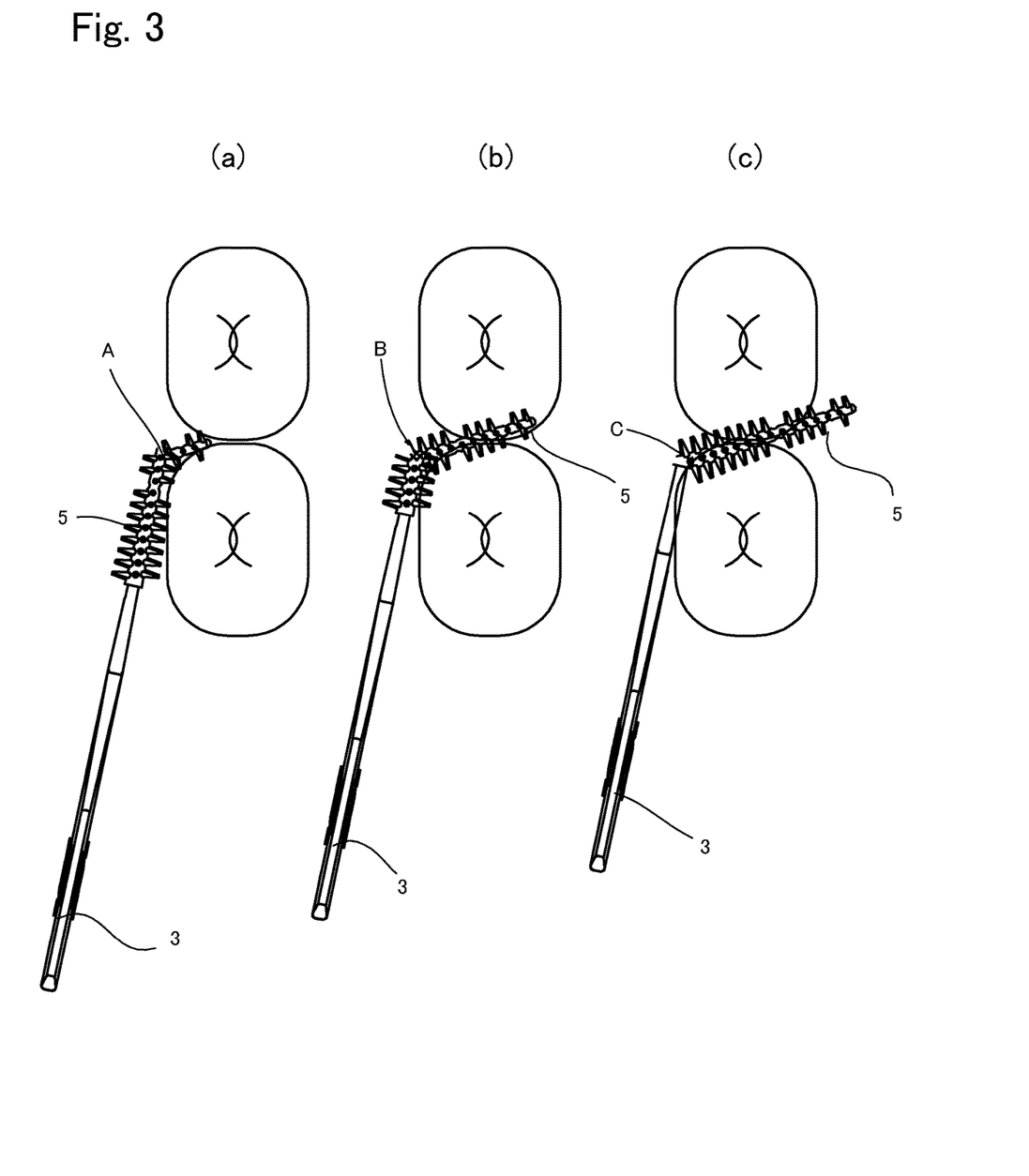
FIG. 3 shows views of bending properties of the interdental cleaning tool when being inserted between teeth.

Accordingly, for example, as shown in FIGS. 3(*a*) and 3(*b*), it is necessary that the cleaning portion 5 is flexibly bent without breaking, substantially uniformly over the area from the leading end (the vicinity of the position A) to the middle portion (the vicinity of a position B). The reason for this is that, if the cleaning portion 5 is likely to be bent at the vicinity of the leading end but becomes unlikely to be bent gradually, it is difficult to insert the cleaning portion 5.

Meanwhile, as shown in FIG. 3(*c*), it is necessary that the cleaning portion 5 is not likely to be bent and has a certain level of hardness when it is inserted up to the vicinity of the rear end (the vicinity of the position C). The reason for this is that, if the hardness of the cleaning portion 5 in the vicinity of the rear end is insufficient, it is difficult to transmit force from the grip portion 3 to the cleaning portion 4 when scraping out plaque by moving the cleaning portion 5 back and forth.

Thus, in the interdental cleaning tool 100 according to the present invention, the bending properties of the interdental cleaning tool 100 is prescribed as follows.

Figure 4:
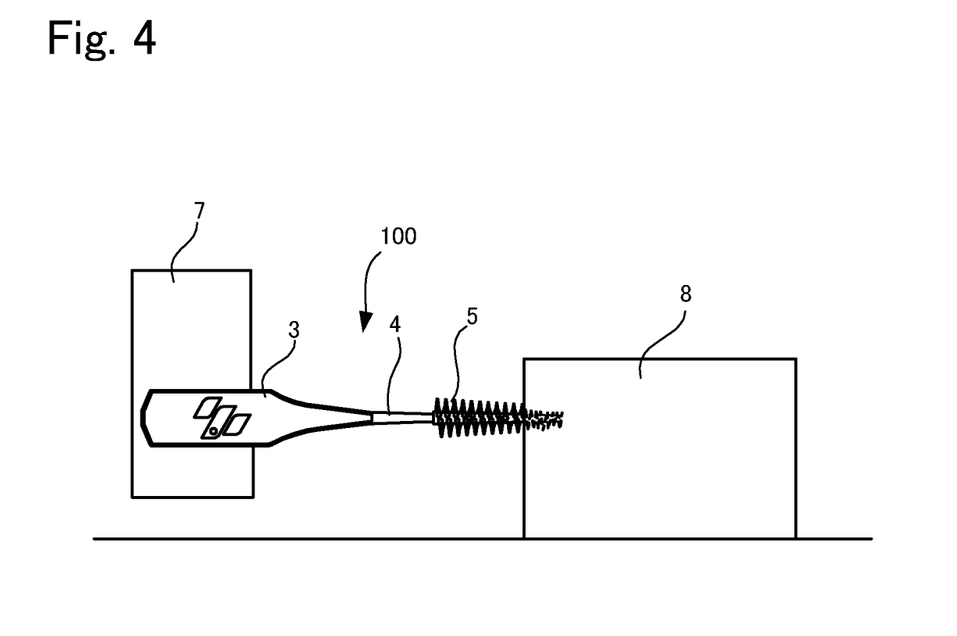
FIG. 4 is a front view of an apparatus for measuring a maximum torque value and an angle thereof when the interdental cleaning tool is bent.
Figure 5:
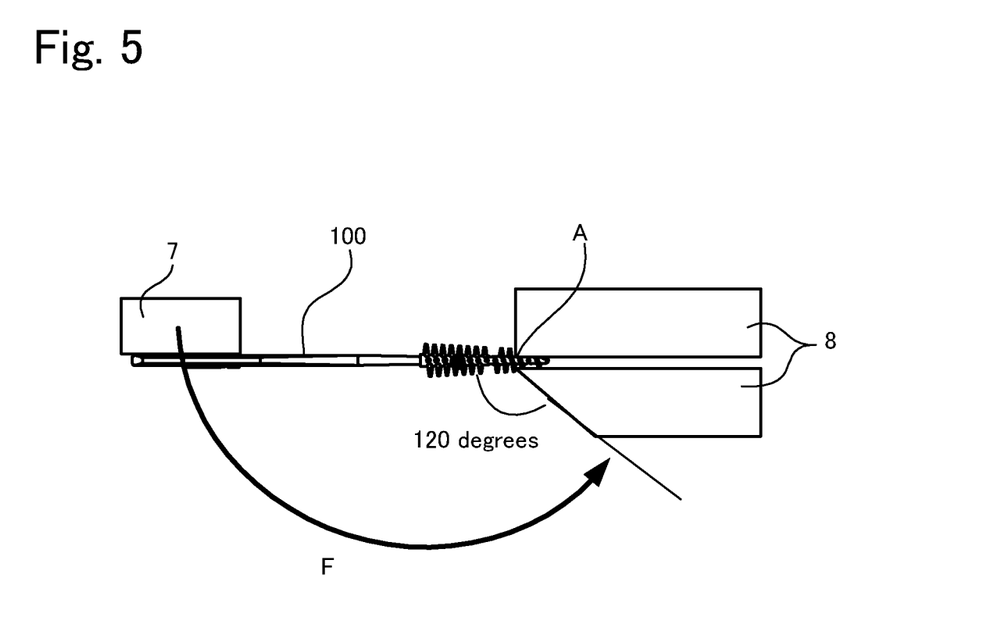
FIG. 5 is a plan view of FIG. 4.

First, as shown in FIG. 1, three points are set along the shaft direction of the cleaning portion 5. The position A is a point located 6 mm away from the leading end, the position B is a point located 10 mm away from the leading end, and the position C is a point located 15 mm away from the leading end. Then, as shown in FIGS. 4 and 5, the cleaning portion 5 is fixed by a jig 8 over the area from the leading end to the position A. The leading end of the cleaning portion 5 is also the leading end of the interdental cleaning tool 100. At this time, the cleaning portion is fixed such that the width direction of the grip portion 3 matches the vertical direction and such that the area of the interdental cleaning tool 100 that is located closer to the rear end than the position A is project from the jig 8.

Next, the grip portion 3 is pressed by an electric torque meter 7, and the grip portion 3 is rotated about the position A by 120 degrees (the arrow F in FIG. 5) in the horizontal direction at a rotational speed of 10 rpm. Accordingly, the shaft portion 4 breaks. Then, a torque value A (N·cm), which is a maximum torque value during the rotation by 120 degrees (immediately before the shaft portion 4 breaks), and a rotational angle a (degrees) when the torque value A is measured are acquired. In a similar manner, a torque value B and a torque value C, which are maximum torque values when the grip portion is rotated about the position B and the position C respectively, and a rotational angle b (degrees) when the torque value B is measured are acquired. It was seen that, at the rotational angles at which these maximum torque values were measured, the interdental cleaning tool 100 broke.

An interdental cleaning tool that satisfies the following relational expression (1) is taken as the interdental cleaning tool 100 according to the present invention.

$$(\text{Rotational angle } b)/(\text{rotational angle } a) \geq 0.82 \qquad (1)$$

As described above, the cleaning portion 5 needs to flexibly bend over the area from the leading end (the vicinity of the position A) to the middle portion (the vicinity of the position B). The inventor of the present invention found that, as a result of evaluations by users, an interdental cleaning tool that satisfies the expression (1) above satisfies this need. Note that (rotational angle b)/(rotational angle a) is preferably close to 1 than 0.82, and more preferably 0.88 or more, for example.

Note that the rotational angles a and b are each preferably 28 degrees or more, and more preferably 40 degrees or more.

Furthermore, as described above, it is easier to scrape out plaque if the strength necessary to bend the cleaning portion 5 is greater at the rear end (the vicinity of the position C) than at the leading end (the vicinity of the position A). The inventor of the present invention found that, as a result of evaluations by users, an interdental cleaning tool that satisfies the expression (2) below further satisfies this need.

$$(\text{Torque value } C) - (\text{torque value } A) \geq 0.8 \text{ N·cm} \quad (2)$$

Furthermore, the torque value C is preferably 1.2 N·cm or more, and more preferably 1.4 N·cm or more.

The interdental cleaning tool 100 according to the present invention satisfies the expression (1), and preferably further satisfies the expression (2).

Furthermore, it is preferable that the interdental cleaning tool 100 according to the present invention is set to have a flexural strength and a modulus of elasticity in bending within prescribed ranges in addition to the bending properties shown in the expressions (1) and (2) above. That is to say, the flexural strength of the interdental cleaning tool 100 according to the present invention is preferably 90 to 175 MPa, more preferably 110 to 160 MPa, and particularly preferably 120 to 150 MPa. The flexural strength is measured as defined by JIS K7171.

The modulus of elasticity in bending of the interdental cleaning tool 100 is preferably 4600 to 8500 MPa, more preferably 5400 to 7500 MPa, and particularly preferably 5800 to 6500 MPa. The modulus of elasticity in bending is measured as defined by JIS K7171.

7. Modified Examples

Although an embodiment of the present invention has been described above, the present invention is not limited to the embodiment above, and various modifications can be made within the scope not departing from the gist of the invention. Note that the following modified examples may be combined as appropriate.

Although the interdental cleaning tool 1 includes the grip portion 3 and the shaft portion 4 that are formed as one piece, they may be separate parts. Furthermore, there is no particular limitation on the shape of the grip portion, as long as it allows the grip portion to be gripped with fingers. Also, there is no particular limitation on the configuration of the cleaning portion 5, as long as it has a shape that enables the cleaning portion to scrape out plaque between teeth, such as the above-described brush-like shape.

Examples

Hereinafter, examples of the interdental cleaning tool according to the present invention will be described. Note that the present invention is not limited to the following examples.

Figure 6:
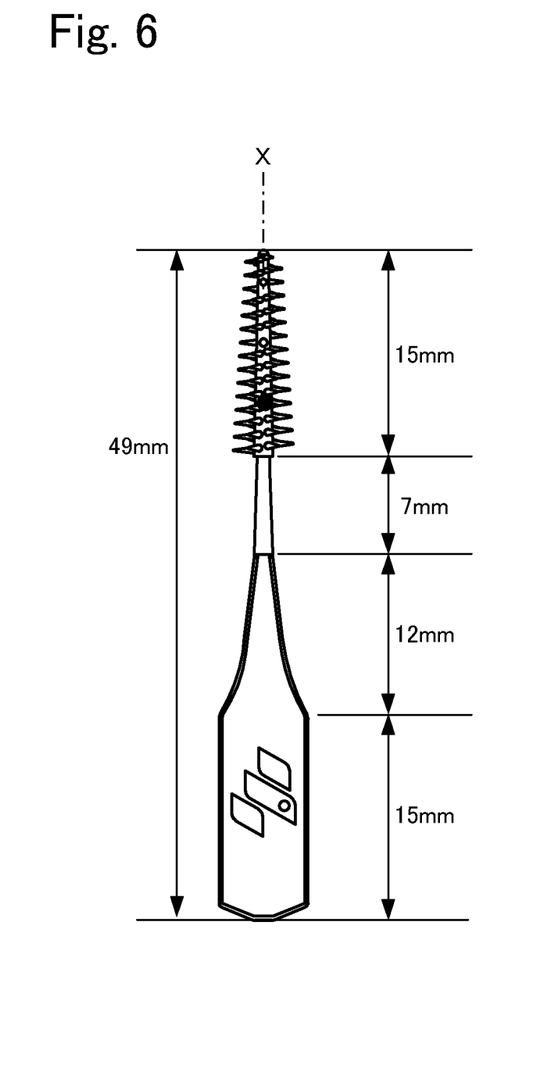
FIG. 6 is a plan view of an interdental cleaning tool according to examples and a comparative example.
Figure 7:
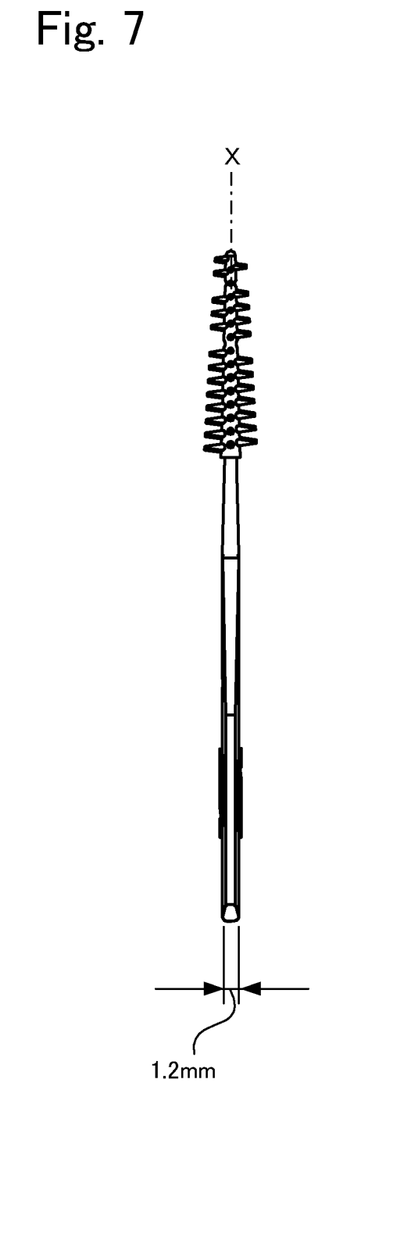
FIG. 7 is a side view of FIG. 5.
Figure 8:
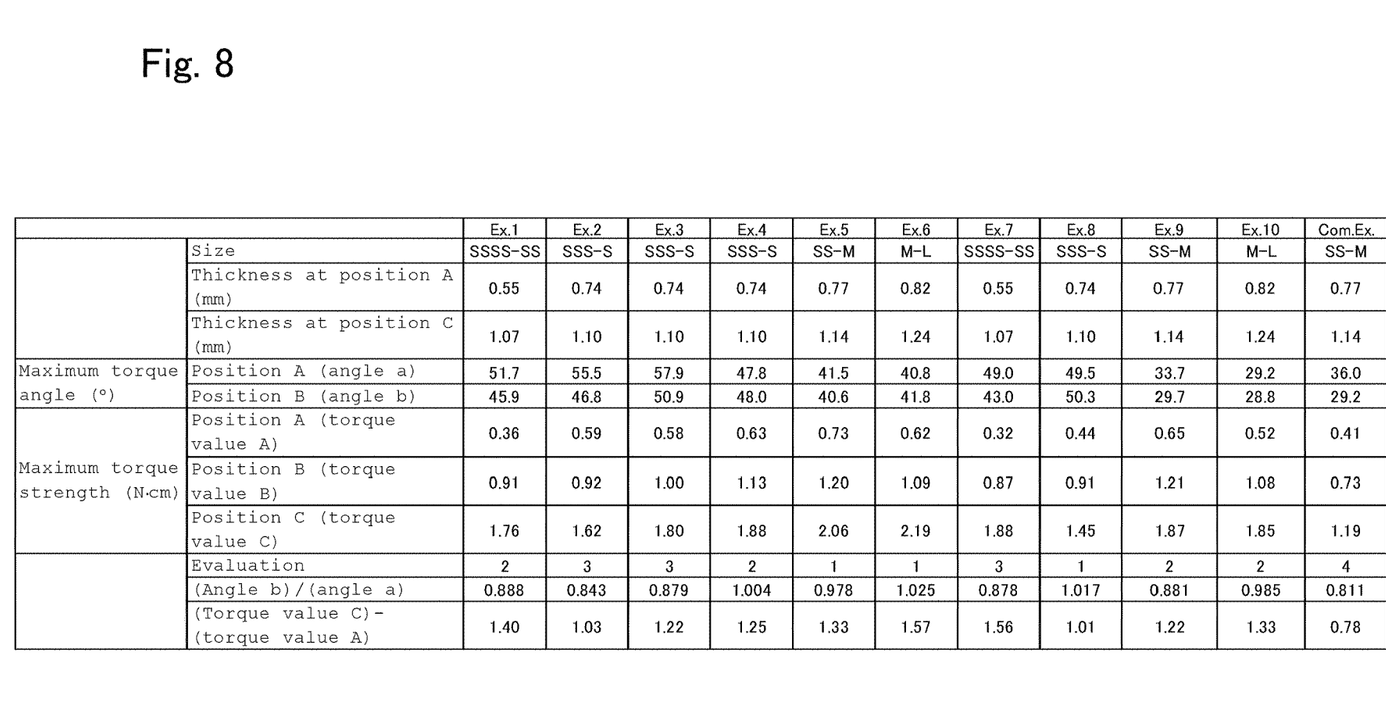
FIG. 8 is a table showing bending properties and the like of interdental cleaning tools according to Examples 1 to 10 and Comparative Example, and evaluation values thereof.

In the following examples, interdental cleaning tools according to Examples 1 to 10 and the Comparative Example having the same shape as that of the foregoing embodiment but made of different resin materials among those mentioned above were produced. Furthermore, the interdental cleaning tools according to the examples and the comparative example had dimensions shown in FIGS. 6 and 7, but had shapes in which a shaft portion and a cleaning portion covering the shaft portion had various outer diameters. That is to say, the tools according to Examples 1 to 10 and the Comparative Example had four sizes as shown in FIG. 8. The details of the sizes are as follows (all values indicate the outer diameters of the cleaning portions).

TABLE 1

| Size | Position A | Position B | Position C |
| --- | --- | --- | --- |
| SSSS-SS | 0.55 mm | 0.83 mm | 1.07 mm |
| SSS-S | 0.74 mm | 0.90 mm | 1.10 mm |
| SS-M | 0.77 mm | 0.95 mm | 1.14 mm |
| M-L | 0.82 mm | 1.02 mm | 1.24 mm |

Next, the thus prepared tools according to the examples and the comparative example were subjected to a test regarding the bending properties described in the foregoing embodiment (the torque values A to C, the rotational angles a to c). Furthermore, those according to the examples and the comparative example were used by males and females aged 30 to 69 years for two weeks, and evaluated. In this test, those with the size SSSS-SS (Examples 1 and 7) were used by 57 people, those with the size SSS-S (Examples 2 to 4, and 8) were used by 88 people, those with the size SS-M (Examples 5 and 9, and the Comparative Example) were used by 110 people, those with the size M-L (Examples 6 and 10) were used by 58 people, and evaluated in terms of overall satisfaction, and the examples and the comparative example were evaluated based on the results. The overall satisfaction was obtained by comprehensively determining the usability (ease of use, easy insertion between teeth) in five grades as follows.

Evaluation of Overall Satisfaction
(i) Satisfied
(ii) Moderately satisfied
(iii) Neither satisfied nor dissatisfied
(iv) Moderately dissatisfied
(v) Dissatisfied The examples and the comparative example were evaluated based on the proportions of the number of people who determined that the tool was satisfactory or moderately satisfactory in the five-grade evaluation.

The evaluation of the examples and the comparative example was as follows.

Evaluation 1: The proportion of satisfactory or moderately satisfactory is 80% or more Evaluation 2: The proportion of satisfactory or moderately satisfactory is 70% or more and less than 80%

Evaluation 3: The proportion of satisfactory or moderately satisfactory is 60% or more and less than 70%

Evaluation 4: The proportion of satisfactory or moderately satisfactory is less than 60%

The result is as shown in FIG. 8. As shown in FIG. 8, the closer the (angle b)/(angle a) (the expression (1) above) was to 1, the more highly the tool was rated, and the comparative example not satisfying the expression (1) was evaluated by the users as being poor. Furthermore, a tool with large (torque value C)–(torque value A) (the expression (2) above) was highly rated, and a tool with small (torque value C)–(torque value A) was poorly rated as in the comparative example. Also, it was found that evaluation by the users was affected more greatly by the expression (1) than by the expression (2).

LIST OF REFERENCE NUMERALS

100 Interdental cleaning tool
3 Grip portion
4 Shaft portion
5 Cleaning portion

The invention claimed is:

1. An interdental cleaning tool comprising:
a cleaning tool body that is made of a synthetic resin, and includes a grip portion that is capable of being gripped with fingers of a user and a shaft portion that extends in one direction from the grip portion; and
a cleaning portion configured to clean between teeth, having bristles, covering a leading end of the shaft portion, and made of an elastomer,
wherein
the shaft portion includes a first region that extends from a leading end of the grip portion and a second region that extends from a leading end of the first region to an upper end of the cleaning portion,
the cleaning portion is adjacent to the second region of shaft portion,
the first region is formed in a substantially triangular shape in a plan view in a thickness direction of the grip portion so that a width of the first region decreases along a longitudinal direction extending from the grip to the second region in the plain view, and in the substantially triangular shape, a length of the first region in the longitudinal direction, as a height, is longer than the width, as a base, in a direction perpendicular to the longitudinal direction,
the second region is formed in a shape of a rod in cross-section,
a length in the second region from the leading end of the first region to the second end of the bristles of the cleaning portion is shorter than the height of the substantially triangular shape of the first region,
(rotational angle b)/(rotational angle a) is 0.82 or more, and
each of the rotational angles a and b is 28 degrees or more,
where the rotational angle a is a rotational angle (degrees) when a torque value A is measured, the torque value A being a maximum torque value (N·cm) when the grip portion is rotated at a rotational speed of 10 rpm about a position located 6 mm away from a leading end of the cleaning portion, and
the rotational angle b is a rotational angle (degrees) when a torque value B is measured, the torque value B being a maximum torque value (N·cm) when the grip portion is rotated at a rotational speed of 10 rpm about a position located 10 mm away from the leading end of the cleaning portion.

2. The interdental cleaning tool according to claim 1,
wherein (torque value C)−(torque value A)≥0.8 is satisfied,
where the torque value C is a maximum torque value (N·cm) when the grip portion is rotated at a rotational speed of 10 rpm about a position located 15 mm away from the leading end of the cleaning portion.

3. The interdental cleaning tool according to claim 2,
wherein an outer diameter of the cleaning portion located 6 mm away from the leading end thereof is 0.4 to 1.5 mm, and
an outer diameter of the cleaning portion located 15 mm away from the leading end thereof is 0.5 to 2.0 mm.

4. The interdental cleaning tool according to claim 2, wherein the cleaning tool body contains a glass fiber.

5. The interdental cleaning tool according to claim 1,
wherein an outer diameter of the cleaning portion located 6 mm away from the leading end thereof is 0.4 to 1.5 mm, and
an outer diameter of the cleaning portion located 15 mm away from the leading end thereof is 0.5 to 2.0 mm.

6. The interdental cleaning tool according to claim 1, wherein the cleaning tool body contains a glass fiber.

* * * * *